(12) United States Patent
Seger et al.

(10) Patent No.: US 9,701,417 B2
(45) Date of Patent: Jul. 11, 2017

(54) INTEGRATED POWER QUALITY MODULE

(71) Applicant: Hamilton Sundstrand Corporation, Charlotte, NC (US)

(72) Inventors: Mark J. Seger, Rockford, IL (US); Trushal D. Patel, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 269 days.

(21) Appl. No.: 14/562,817

(22) Filed: Dec. 8, 2014

(65) Prior Publication Data

US 2016/0159491 A1    Jun. 9, 2016

(51) Int. Cl.
| | |
|---|---|
| *B60L 1/00* | (2006.01) |
| *B64D 41/00* | (2006.01) |
| *H02J 1/10* | (2006.01) |
| *H02J 3/38* | (2006.01) |
| *H02J 4/00* | (2006.01) |
| *B64D 27/00* | (2006.01) |

(52) U.S. Cl.
CPC ............... *B64D 41/00* (2013.01); *H02J 1/10* (2013.01); *H02J 3/38* (2013.01); *H02J 4/00* (2013.01); *B64D 27/00* (2013.01); *B64D 2221/00* (2013.01)

(58) Field of Classification Search
CPC .... B64D 41/00; B64D 27/00; B64D 2221/00; H02J 3/38; H02J 4/00; H02J 1/10
USPC ........................................................ 307/9.1
See application file for complete search history.

(56) References Cited

U.S. PATENT DOCUMENTS

| | | | | |
|---|---|---|---|---|
| 5,754,033 A | * | 5/1998 | Thomson | H02J 3/38 307/57 |
| 2008/0111420 A1 | * | 5/2008 | Anghel | H02J 4/00 307/9.1 |
| 2012/0013177 A1 | * | 1/2012 | Krenz | H02J 4/00 307/9.1 |
| 2012/0232728 A1 | * | 9/2012 | Karimi | H02J 3/38 701/22 |

FOREIGN PATENT DOCUMENTS

| | | |
|---|---|---|
| EP | 2650997 | 10/2013 |
| EP | 2775457 | 9/2014 |

OTHER PUBLICATIONS

International Search Report, International Application No./Patent No. 15198452.3—1804, Date of Mailing May 9, 2016, European Patent Office; International Search Report 6 pages.

\* cited by examiner

*Primary Examiner* — Jared Fureman
*Assistant Examiner* — Duc M Pham
(74) *Attorney, Agent, or Firm* — Cantor Colburn LLP

(57) ABSTRACT

A power quality control system configured to control and monitor electrical systems is provided. The system includes a first generator control unit configured to control a power of a first generator, a second generator control unit configured to control a power of a second generator, and a first integrated power quality module integrated with the first generator control unit and configured to operate as a power quality check for the second generator control unit.

9 Claims, 3 Drawing Sheets

INTEGRATED POWER QUALITY MODULE

BACKGROUND OF THE INVENTION

The embodiments herein generally relate to power controllers and more particularly to integrated power quality modules.

Power quality plays a significant role in modern electronics, including in industries such as aerospace, ground vehicles, and industrial systems. For example, the commercial aircraft business is moving toward having electrical no-bleed-air environmental control systems, electrical variable-frequency power distribution systems, and electrical actuation. Similarly, for example, ground vehicles have migrated toward hybrid electric technology, where the main propulsion is performed by electric drives. Therefore, a substantial demand for increased power electronics in these areas has emerged.

These trends have significantly increased the installed electrical sources and loads, along with the challenges to accommodate electrical equipment to new platforms. This has led to increased operating voltages and efforts to reduce system losses, weight, and volume. A new set of electrical power quality requirements has been created to satisfy system performance. Traditionally, the sources (electric generators) are required to maintain certain power quality requirements and their loads are to be able to operate at these requirements. Also, the loads are required to not create power quality disturbances on the distribution buses above certain levels. Yet the probability of power quality issues has increased due to the large number of installed electric equipment and their complex interactions. Further, power quality issues may lead to catastrophic failures and/or events that should be prevented.

Power quality is required to allow for compatibility between sources and loads installed on the same power distribution bus. For example, a typical aircraft electric power system consists of a main power source, an emergency power source, power conversion equipment, control/protection equipment, and an interconnect network (i.e. wires, cables and connectors). The main power source comprises the main generators, driven by the aircraft propulsion engines. Emergency power is extracted from aircraft batteries, aircraft independent auxiliary power units (APUs), and aircraft ram air or hydraulically driven generators.

Power quality requirements for AC electrical equipment consist of a large number of parameters. Some of these parameters include current distortion, inrush current, voltage distortion, voltage modulation, power factor, phase balance and DC content. Power quality is a major concern for aircraft because a large number of electric power systems and equipment are installed on the same electrical bus. The power quality of these systems and equipment has stringent requirements to ensure that all power supplies/utilization equipment function properly together.

For power supply equipment additional monitoring features are implemented to detect and isolate equipment, or groups of equipment, that may experience a power quality issue. This isolation capability is to protect other operating power supplies and utilization equipment. For power utilization equipment, strict power quality requirements are imposed. Some reasons for the requirements are as follows: (a) equipment contributing to power quality problems cause other equipment to fail; (b) equipment is prevented from achieving its design performance or reliability due to the reduced power quality of the source; (c) perhaps to meet a desired minimum weight, equipment designed with no power margin tends to be more susceptible to power quality issues; and (d) equipment designed to minimize weight tends to create power quality issues.

There are scenarios where a single equipment failure may propagate and create bus power quality non-compliance, leading to potential additional failures. For example, a single power source failure could fail to isolate power quality deficiencies and may damage utilization equipment or other power sources. A single utilization equipment failure may create non-compliant power quality bus and lead to other utilization equipment failure and/or power source failure. Utilization equipment can experience a destructive failure due to its own power quality non-compliance, and utilization equipment may fail regardless of the source of the power quality non-compliance on the bus.

BRIEF DESCRIPTION OF THE INVENTION

According to one embodiment, a power quality control system configured to control and monitor electrical systems is provided. The system includes a first generator control unit configured to control a power of a first generator, a second generator control unit configured to control a power of a second generator, and a first integrated power quality module integrated with the first generator control unit and configured to operate as a power quality check for the second generator control unit.

According to another embodiment, a method of controlling a power quality in an electrical system is provided. The method includes monitoring and controlling the power generated by a first generator with a first generator control unit having an integrated first power quality module, monitoring and controlling the power generated by a second generator with a second generator control unit, and monitoring and controlling the second generator control unit with the first power quality module of the first generator control unit.

Technical effects of embodiments of the invention include providing a redundant power quality system without adding additional hardware or significant additional hardware. Further technical effects of embodiments of the invention include an integrated power quality module that is easily incorporated into existing power quality and control systems, and/or provide minimal structural changes to existing systems while incorporating additional safety redundancies in monitoring power quality in electrical systems.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION OF THE INVENTION

Figure 1:
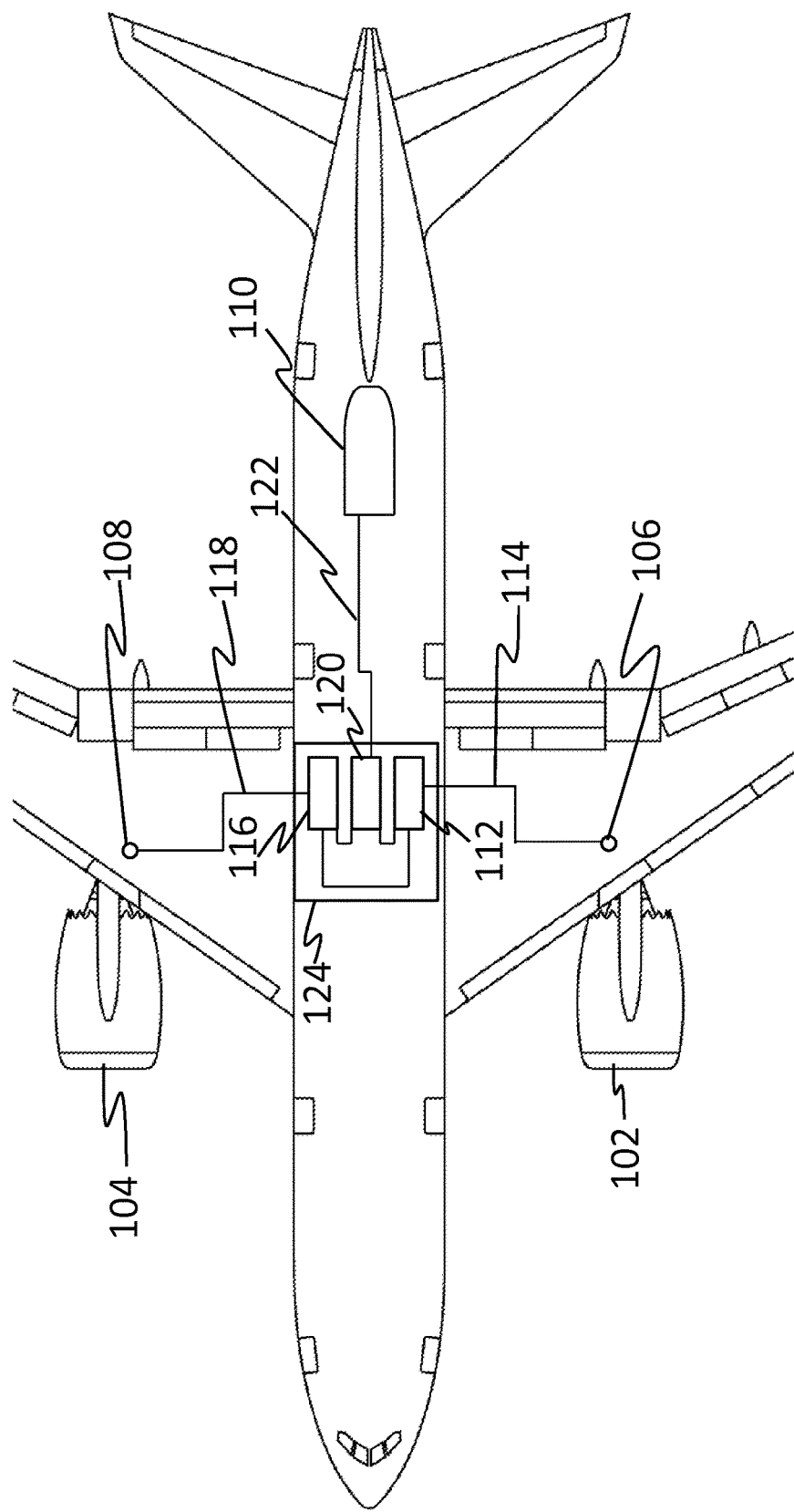
FIG. 1 is a schematic view of an aircraft including a power quality and control system in accordance with an exemplary embodiment of the invention.

Referring to FIG. 1, a schematic of an aircraft 100 is shown. Aircraft 100 includes a first engine 102 and a second engine 104. A first electric generator 106 is driven by the first engine 102 and a second electric generator 108 is driven by the second engine 104. The aircraft 100 also includes a third electrical generator 110, such as an auxiliary power generator. The three generators 106, 108, and 110 are connected to the electrical systems of the aircraft and provide power thereto. The electrical power provided by the generators 106, 108, and 110 provide power, as one task, to the control and mechanical components of the aircraft 100.

As discussed above, the quality of the power may have adverse effects on the entire system. For example, power quality issues may lead to various detrimental outcomes that are to be avoided. For example, in the event of a complete power failure the electrical systems may cease to function entirely. In this eventuality the equipment may be destroyed, which in some instances is a preferred result. Alternatively, rather than completely failing, the electrical equipment of the aircraft 100 may operate in unexpected ways due to power quality issues, including power surges, reductions in power, etc. For example, the electrical systems that control the ailerons and flaps of the wings of an aircraft may operate in a manner that will cause an aircraft to enter a spin. In this example, it is preferred that the equipment completely fails, rather than causing unexpected results due to the extreme results of the power quality issues.

Accordingly, the electrical generators 106, 108, and 110 are connected to controllers to control the quality of the power and to provide a measure of safety and prevent unexpected events from occurring. As shown in FIG. 1, the first generator 106 is connected to a first generator control unit 112 by wiring 114; the second generator 108 is connected to a second generator control unit 116 by wiring 118; and the third generator 110 is connected to a third generator control unit 120 by wiring 122. The generator control units 112, 116, and 120 may all be located proximal to each other, and remote from the generators they each control. For example, the generator control units 112, 116, and 120 may be located in an avionics bay 124 of the aircraft 100. Each of the generator control units 112, 116, 120 may be configured to monitor the power quality of the associated generator 106, 108, and 110. If the power quality is determined to be poor or bad, the generator control unit is configured to trip a contactor and the associated generator.

Figure 2:
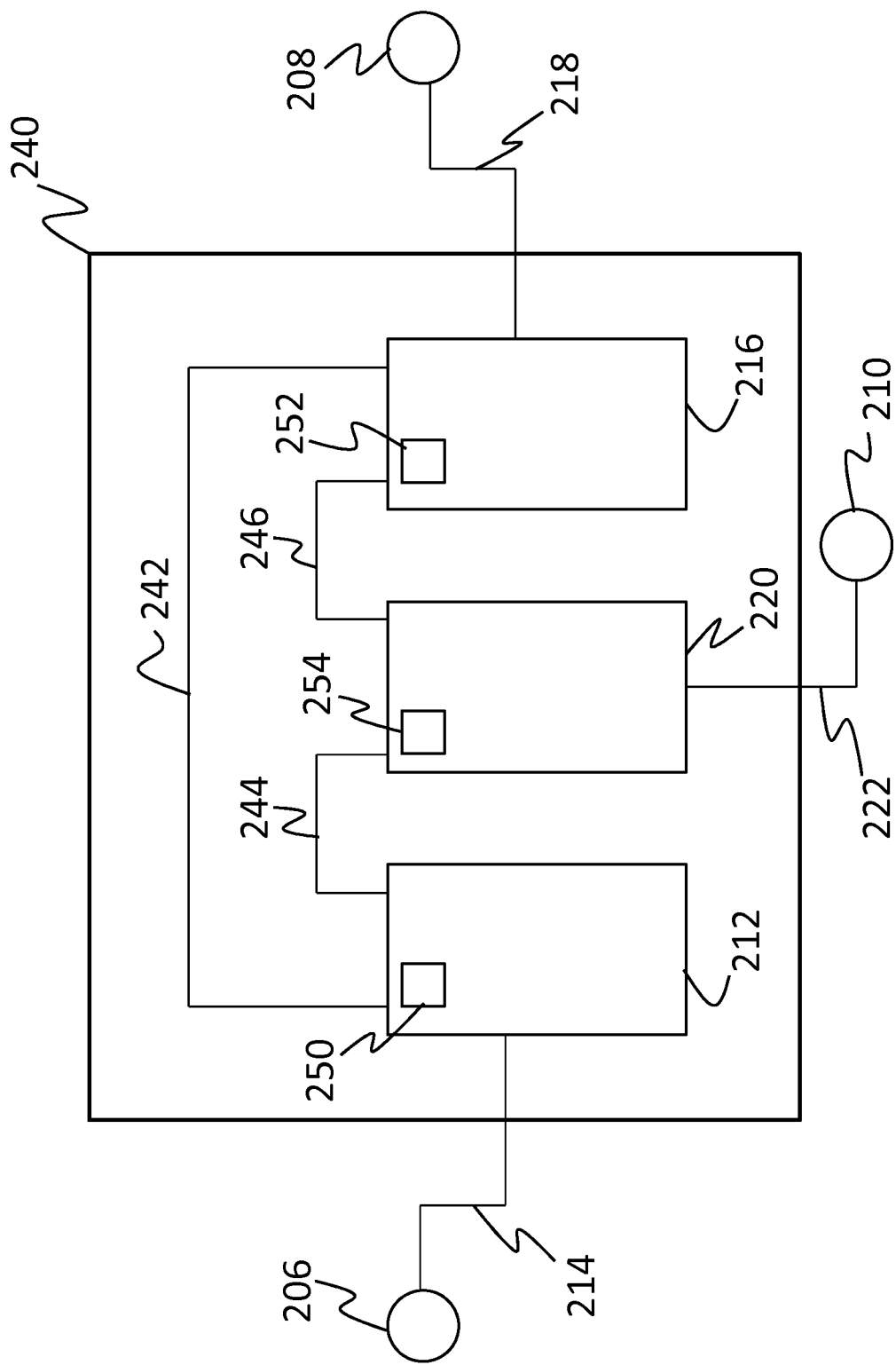
FIG. 2 is a schematic illustration of the electrical connections of power quality and control system in accordance with an exemplary embodiment of the invention.

Turning now to FIG. 2, an electrical schematic set-up of an electrical control system in accordance with an exemplary embodiment of the invention is shown. The features of FIG. 2 are similar to the features of FIG. 1, and thus like features in FIG. 2 are preceded by the number "2," rather than "1."

As shown in FIG. 2, generator control units 212, 216, and 220 may be contained within an enclosure 240, with wiring 214, 218, and 222 extending from the enclosure 240 to the generators 206, 208, and 210, respectively, and providing communication therebetween. Each of the generator control units 212, 216, 220 is configured to monitor the power quality of the associated generator 206, 208, and 210. If the power quality is determined to be poor or bad, the generator control unit is configured to trip a contactor and the associated generator.

Further, the generator control units 212, 216, and 220, as shown, are interconnected and/or in communication with each other. First generator control unit 212 connects to second generator control unit 216 by means of a wire 242 and first generator control unit 212 connects to third generator control unit 220 by means of a wire 244. Further, second generator control unit 216 connects to third generator control unit 220 by means of a wire 246. Thus, each of the generator control units 212, 216, and 220 is connected to the other generator control units within enclosure 240.

Each generator control unit 212, 216, and 220 may comprise a circuit board(s) or other electrical component(s) with controllers and means for electrically communicating with other devices. Thus, each generator control unit 212, 216, and 220 may include one or more central processing units or similar control electronics, which enable control over the power quality of the associated generators.

To provide a redundant safety system, each generator control unit 212, 216, and 220 may have a power quality module to further control and monitor the power quality of the system. However, because there are three generator control units, including a power quality module for each generator control unit would lead to six total units, thus essentially doubling the size of the space required to house the generator control units. Doubling the number of control units/modules also increases the weight on the aircraft, which is undesirable.

Accordingly, in accordance with an exemplary embodiment of the invention, each generator control unit 212, 216, and 220 may serve dual purposes. Each generator control unit can control the power quality of the associated generator, but also may serve as a power quality module for another generator control unit within the system. For example, as shown in FIG. 2, a first power quality module 250 is integrated with the first generator control unit 212. The integrated power quality module 250 of the first generator control unit 212 provides a redundant backup and control check on the second generator control unit 216 through the wiring 242. Similarly, the second generator control unit 216 includes a second integrated power quality module 252 that provides redundant backup and control check on the third generator control unit 220. Finally, third generator control unit 220 includes a third integrated power quality module 254 that provides redundant backup and control check on the first generator control unit 212. The redundant power quality modules 250, 252, 254 are configured to provide control such that the if the connected generator provides bad or poor power quality, and the associated generator control unit of that generator fails to trip the contactor and generator, the power quality module from another unit will trip the contactor and generator.

The integrated power quality modules 250, 252, and 254 may be configured as independent circuitry that is integrated with and/or into the respective generator control units 212, 216, and 220. This is due, in part, to the integrated power quality modules 250, 252, and 254 monitoring the respective generator control units 212, 216, and 220, rather than the generators 206, 208, 210 directly. The independent circuitry of the integrated power quality modules 250, 252, and 254 allows for a completely independent and redundant monitoring of the generator control units 212, 216, 220, which enables the prevention of electrical failures and other similar events from occurring.

Figure 3:
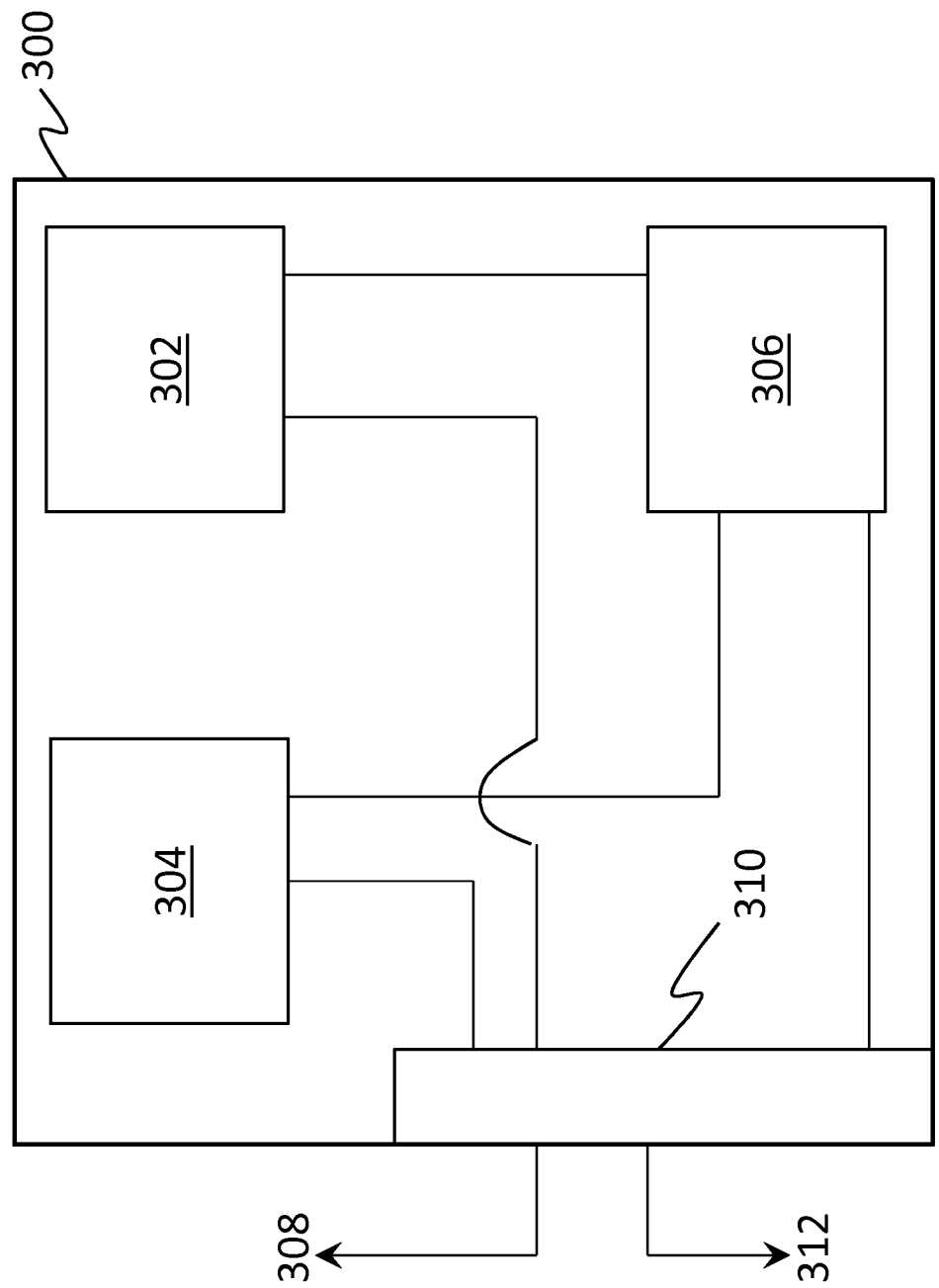
FIG. 3 is a schematic illustration of a generator control unit having an integrated power quality module in accordance with an exemplary embodiment of the invention.

Turning now to FIG. 3, an exemplary generator control unit 300 is shown with an integrated power quality module 302 installed therewith. Generator control unit 300, as shown in FIG. 3, is an exemplary representative schematic of a generator control unit that incorporate the invention, such as generator control units 212, 216, and 220 shown in FIG. 2.

Generator control unit 300 includes a central processing unit 304 and a power supply 306. The central processing unit 304 is configured to perform power control and monitoring of an associated generator 308. The central processing unit 304 communicates with the associated generator 308 through a communications bus 310. The power supply 306 provides power to the generator control unit 300 and the component parts thereof, such as the central processing unit 304 and the communications bus 310.

The integrated power quality module 302 of the generator control unit 300 is also powered by the power supply 306. Further, the power quality module 302 is connected to the communications bus 310 and employs the communications bus 310 to communicate with a second generator control unit 312. The power quality module 302 is configured to monitor and control the second generator control unit 312 and is configured as a redundant system for the power quality within the electrical system. For example, the power quality module 302 will monitor the quality of the power that is controlled by the second generator control unit 312 to provide an additional level of power control within an electrical system that generator control unit 300 is part of Thus, a generator control unit in accordance with the invention can include a power quality module thereon. This enables the generator control unit to monitor and control the power of a generator that the generator control unit is in communication with and also monitor a second generator control unit within the system, to thereby provide additional quality control of the electrical systems that are monitored.

Advantageously, by incorporating the power quality modules into the generator control units, there is a reduction of necessary weight, circuitry, and power required to operate the power quality control system. For example, as shown in FIG. 3, the integrated power quality module 302 contained on the generator control unit 300 may share a single power supply 306 for the processing units of the module 302 and unit 300. Further, the integrated power quality module 302 may share the same communications bus and wiring as the control unit 300 which further reduces the additional hardware that must be used in order to provide redundant electrical monitoring, as disclosed herein.

Advantageously, embodiments of the invention provide a simple redundant safety monitoring system that may be employed without the need for additional hardware or at least the need for significant additional hardware. The inclusion of an integrated power quality module within a preexisting generator control unit reduces the volume and weight requirements to implement a safety system as disclosed herein. Further, by employing a single power supply for both monitoring units, additional power is not required within the system, such as the inclusion of additional back-up batteries or other similar power supplies.

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments.

For example, although described as a completely separate, but integrated, unit included within the generator control unit with separate processing components, a variation of the invention may include the generator control unit functions and the power quality module functions within a single processor within a single generator control unit. Thus, in this embodiment, further reduction to size and component parts may be achieved. Moreover, although embodiments disclosed herein operated with three electric generators, those skilled in the art will appreciate that this is merely exemplary, and is not limiting. Thus, various systems that have more than one electric generator and more than one generator control unit may incorporate the invention. Moreover, although described herein with respect to an aircraft electrical system, those skilled in the art will appreciate that embodiments of the invention may be applied to any electrical systems wherein power quality is concerned, including in vehicles and industrial applications.

Accordingly, the invention is not to be seen as limited by the foregoing description, but is only limited by the scope of the appended claims.

What is claimed is:

1. An aircraft power quality control system configured to control and monitor electrical systems of the aircraft, comprising
    an enclosure positioned within an avionic bay of the aircraft;
    a first generator control unit housed within the enclosure and configured to control a power of a first generator of the aircraft, wherein the first generator is an engine driven generator of the aircraft;
    a second generator control unit housed within the enclosure and configured to control a power of a second generator of the aircraft, wherein the second generator is an auxiliary power generate of the aircraft; and
    a first integrated power quality module integrated with the first generator control unit and configured to operate as a power quality check for the second generator control unit to monitor power quality of the second generator.

2. The power quality control system of claim 1, further comprising a second integrated power quality module integrated with the second generator control unit and configured to operate as a power quality check for the first generator control unit to monitor power quality of the first generator.

3. The power quality control system of claim 2, further comprising:
    a third generator control unit housed within the enclosure and configured to control the power of a third electric generator of the aircraft;
    a third integrated power quality module integrated with the third generator control unit and configured to operate as a power quality check for the first generator control unit.

4. The control system of claim 1, wherein the first generator control unit includes a central processing unit configured to control the power of the first generator, the system further comprising a power supply integrated with the first generator control unit and configured to supply power to the central processing unit of the first generator control unit and to the first integrated power quality module.

5. The control system of claim 1, wherein power quality includes at least one of current distortion, inrush current, voltage distortion, voltage modulation, power factor, phase balance, and DC content.

6. A method of controlling a power quality in an electrical system of an aircraft, comprising:
    monitoring and controlling the power generated by a first generator with a first generator control unit having an integrated first power quality module, wherein the first generator is an engine driven generator of the aircraft;
    monitoring and controlling the power generated by a second generator with a second generator control unit, wherein the second generator is an auxiliary power generator of the aircraft; and monitoring and controlling the second generator control unit with the first power quality module of the first generator control unit to monitor power quality of the second generator.

7. The method of claim 6, wherein the second generator control unit includes an integrated second power quality module, the method further comprising monitoring and controlling the first generator control unit with the second power quality module to monitor power quality of the first generator.

8. The method of claim 7, wherein the system includes a third generator control unit having an integrated third power quality module, the method further comprising:
monitoring and controlling the power generator by a third generator with the third generator control unit;
monitoring and controlling the third generator control unit with the second power quality module including monitoring power quality of the third generator; and
monitoring and controlling the first generator control unit with the third power quality module including monitoring power quality of the first generator.

9. The method of claim 6, wherein power quality includes at least one of the current distortion, inrush current, voltage distortion, voltage modulation, power factor, phase balance, and DC content.

* * * * *